United States Patent Office 3,097,245
Patented July 9, 1963

3,097,245
PROCESS FOR THE PREPARATION OF TRIMETHYLOLALKANE
Edward J. Russell and Robert J. Ruhf, Allentown, Pa., assignors to Trojan Powder Company, a corporation of New York
No Drawing. Filed Jan. 13, 1959, Ser. No. 786,454
7 Claims. (Cl. 260—635)

This invention relates to a process for the preparation of trimethylolalkanes such as trimethylolethane having improved use characteristics including good color, and to the improved trimethylolalkane product obtainable by this process, and to synthetic resins prepared from such products.

Trimethylolalkanes such as trimethylolethane are customarily prepared by the condensation of the corresponding aldehyde with aqueous formaldehyde in the presence of an alkaline catalyst, usually lime or sodium hydroxide. Propionaldehyde and formaldehyde react to form trimethylolethane; butyraldehyde and formaldehyde produce trimethylolpropane; and valeraldehyde and formaldehyde yield trimethylolbutane. The reaction is exothermic, and fairly rapid. It normally is carried out by mixing the ingredients at room temperature or somewhat below, after which the temperature is allowed to rise to within the range of 40 to 55° C. (cf. U.S. Patent No. 2,790,837 to Robeson), and is continued until complete, as evidenced by the free formaldehyde content of the reaction mixture, after which the mixture is acidified.

The principal difficulty preented by the process is the isolation of the trimethylolalkane from the reaction mixture. The reaction mixture may contain not only the desired trimethylolalkane but many types of by-products, such as formals, formates and ethers, unreacted aldehydes, and substantial quantities of the formic acid salt of the catalyst, i.e., calcium or sodium formate. The impurities and by-products which are present impair the quality of the trimethylolalkane because they lead to the development of dark color when the polyol is used in the preparation of alkyd and polyester resins, and accordingly it has been accepted that these should be removed in order to produce a product of good quality.

The complete removal of these impurities or the separation of the trimethylolalkane from them can become rather complicated. Various ways of doing this have been suggested, but none has proved fully satisfactory from the industrial standpoint, because of low yields, high cost, or low purity of the product. For many purposes, trimethylolalkane must meet rigid standards and should be free from formate salt and other detrimental impurities. There has been no way known of separating the impurities from the by-products, and so the trimethylolalkane has usually been separated from both in the course of the purification.

Brubaker et al. No. 2,292,926 suggest distillation of their trimethylolethane product with superheated steam in a vacuum. The trimethylolethane which distills does not always have a good color, because of the high temperatures to which it is subjected during the distillation. Moreover, the process is slow, and the product is contaminated with the other polyols, and with a large amount of water, which must be removed. Thus, Brubaker et al. suggest that if pure crystals are desired the product should be recrystallized from acetone.

It has been proposed by a number of workers that trimethylolethane be separated by extraction with a solvent in which it is more soluble than the other components of the reaction mixture. Wyler No. 2,468,718 employs acetone or other low boiling water soluble ketones. Robeson No. 2,790,837 prefers azeotropic alcohols such as isopropanol which form a second phase immiscible in the reaction mixture.

Poitras et al. No. 2,420,496 concentrate the reaction mixture and then extract with a water-soluble aliphatic alcohol immiscible in the reaction mixture. The trimethylolethane is separated from the solvent by crystallization.

Gottesman et al. in a series of patents Nos. 2,806,890, 2,806,891 and 2,806,889 dealing with the use of organic solvents proposes that the reaction mixture be dried, and then extracted with ethyl acetate, or that the reaction mixture be extracted with ketones such as methylisobutyl ketone, ethyl acetate, or amyl and butyl alcohols, and the product recrystallized. De Lorenzo No. 2,806,892 also uses ethyl acetate.

In some cases, the solvents are used in combination with a fractional crystallization step in which the reaction mixture is concentrated so as to precipitate some of the calcium formate and thus concentrate the trimethylolethane in the liquor which is to be extracted.

All of the solvent extraction procedures have the disadvantages that an additional component is needed which must not only be combined with the reaction mixture, increasing the volume of the mix which must be handled, but also be separated from the trimethylolethane at a later stage, so that the latter can be recovered. Consequently, these processes are expensive because of the increased handling and processing operations involved.

Gangwer No. 2,671,118 concentrates the reaction mixture to crystallize the formate and then crystallizes trimethylolethane from the residual liquor in the form of the dihydrate. This eliminates the other complex impurities not separated in solvent extraction. Trimethylolethane prepared as the dihydrate must be further treated to remove the water of hydration, with subsequent recrystallization, and this is one of the disadvantages of this process. Robeson No. 2,790,837 also uses a crystallization process, or a combined crystallization-solvent extraction process.

A few workers have suggested variations in the process of preparation so as to avoid obtaining such a complex reaction mixture. Walker No. 2,400,724 pointed out that the formation of alkali metal formate could be avoided by hydrogenating the first stage reaction product, to convert the methylol aldol to the polyhydroxy compound. However, it is difficult to avoid formation of some formic acid or its formate salt because there is no way of arresting the reaction at the first stage. Robeson No. 2,818,443, recognizing this, proposed another type of catalyst, an anion exchange resin, in lieu of the lime or sodium hydroxide. However, very large amounts of these expensive resins are required and this process has not been capable of giving as high yields as with a conventional catalyst.

In accordance with the instant invention, a process is provided for preparing trimethylolalkanes having from five to seven carbon atoms from the corresponding straight chain alkanol and formaldehyde, using an alkaline catalyst, which is capable of giving a good yield of trimethylolalkane with a minimum of processing operations. In this process, modifications are made both in the conventional reaction of the aldehyde and formaldehyde and in the working-up procedure for recovering the trimethylolalkane from the reaction mixture.

An important advantage of the process is that without the elaborate purification treatments heretofore employed it is possible to prepare a product which is actually better than the pure trimethylolalkane in the production of alkyd and polyester resins. Since the elaborate purification processes heretofore employed are not necessary, this superior product can be produced at a lower cost than heretofore.

The product is of good quality and good color and furthermore has unexpected and unique properties not possessed by trimethylolalkane prepared by other procedures or by pure trimethylolalkane. The heat stable trimethylolalkane products of the invention such as the trimethylolethane product having a color on the APHA color scale of between about 50 and about 200 when in the form of a molten mixture of said trimethylolalkane product with an equal part of phthalic anhydride after seven minutes at 200° C.

In physical properties, the trimethylolalkane product is not greatly different from pure trimethylolalkane. The principal difference is that it has a lower melting point than the pure material. Trimethylolethane melts at 201° C. The melting point of the trimethylolethane of the invention is below 200° C., and usually within the range from about 165 to 190° C. Trimethylolbutane melts at 101° C. The melting point of the trimethylolbutane of the invention is below 100° C., and usually within the range from 75 to 95° C.

The trimethylolalkane product contains from 3 to 10% of organic materials. These have not been fully identified, but are thought to be by-products of the reaction of the aldehyde and the formaldehyde. The following are the most important of the chemicals thought to be present:

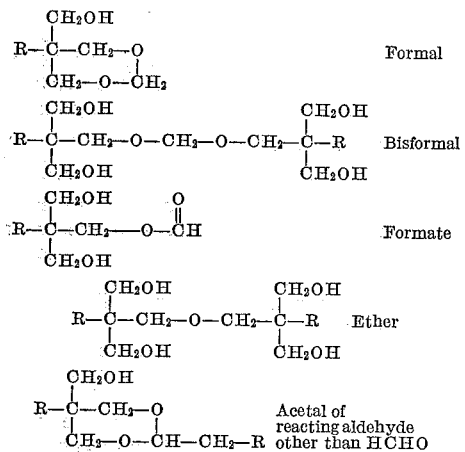

where R is a straight chain alkyl radical having from one to three carbon atoms, such as $CH_3$, $CH_3CH_2$ or $CH_3CH_2CH_2$.

The trimethylolalkane of the invention is substantially free from inorganic salts such as the formate salt of the alkaline catalyst used in the reaction. The salt content is less than 0.1%, and in most cases less than 0.075%. It is well known that inorganic salts tend to cause decomposition of the trimethylolalkane when it is heated at elevated temperatures.

Chemically, the product has unique properties, which may be due to the content of organic material as identified above. The product imparts a faster rate of reaction in the formation of alkyd resins, and the reaction mixture accordingly will body in less time than is required when pure trimethylolalkane is used. The organic material present in the product is not the same as that in crude trimethylolalkane, because it is substantially free from color-forming bodies. These bodies may be present in many of the reaction mixtures of the invention before processing, but if they are, they are removed during processing. The organic material present is accordingly non-deleterious, and even advantageous in some uses, as compared with the organic material present in the original reaction mixture.

The alkanal corresponding to the trimethylolalkane desired and formaldehyde are reacted in accordance with the invention at a temperature below 40° C., and preferably from 30 to 35° C. Heretofore, the reaction ingredients have been mixed together at a temperature within this range but thereafter in many cases the temperature has been allowed to rise to from 40 to 55° C., or even higher, and reaction to proceed at this temperature until complete. It has now been determined that this is undesirable and that the reaction temperatures should not be permitted to exceed 40° C.

The reaction may be represented as follows:

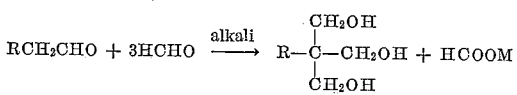

where R is a straight chain alkyl group of from one to three carbon atoms and M is the metal of the alkaline catalyst.

The proportions of alkanal and formaldehyde are stoichiometric, and according to the above equation for each mole of alkanal there can be used three or more moles of formaldehyde. However, more than 3½ moles of formaldehyde is not required, and may in fact be wasteful, so that usually from 3 to 3½ moles of formaldehyde would be preferred.

The reaction proceeds in the presence of water, some of which is normally supplied with the formaldehyde as aqueous formalin solution. However, an excessive concentration of reactive ingredients is undesirable since by-products are then formed in greater amounts and the yield of trimethylolalkane is lower. Usually, the reactive ingredients should be present in an amount within the range from 5 to 20% by weight of the reaction mixture. From 10 to 15% gives excellent yields, and is preferred.

The reaction mixture should be alkaline and at a pH above 10. For this purpose, a strong alkali is incorporated therein, in an amount sufficient to neutralize the formic acid that is formed, and provide a reserve of alkalinity in the mixture until reaction has reached the desired stage. Calcium oxide or calcium hydroxide are the preferred agents. Other alkaline compounds can be used, such as the hydroxides of the alkali and other alkaline earth metals, for example, sodium hydroxide and potassium hydroxide.

During the first stage of the reaction, resulting in aldol formation, the alkali acts as a catalyst, and only a small amount is needed. In the second stage, it reacts stoichiometrically, and forms the formate salt. Therefore, the amount of the alkali is stoichiometrically equivalent to the amount of formaldehyde required to convert the aldol to the trimethylolalkane, plus a slight excess.

In the case of trimethylolethane, the reaction time is important to the color of the product. For optimum color the reaction should not be permitted to continue for more than seven hours. Again, this operation is somewhat different from prior procedures. Heretofore, as is well known, the reaction has been permitted to continue for long periods of time if it is carried out at the lower temperatures. Where high temperatures are used during the course of the reaction such as 40° C. and higher, the reaction time has been proportionately reduced. It has been determined, however, in accordance with this invention, that at reaction times in excess of seven hours at temperatures below 40° C. a secondary reaction (as yet unidentified) sets in, which results in the formation of a highly colored trimethylolalkane. Probably, colored by-products are formed. Consequently, in order to obtain good color in the product, it is necessary to arrest the reaction well short of the completion, and at least by the time seven hours have elapsed from the time the reaction is initiated, as by mixing the reaction components.

After the reaction has been permitted to proceed for the allotted time, the alkalinity of the reaction mixture is reduced sufficiently to stop the reaction, usually to pH 8 or below, to prevent the reaction from continuing during filtration. This neutralizes excess alkaline agent. The reaction mixture then is filtered to remove solid material, and the pH is then brought to below 7 by addition of more acid, if necessary. The reaction mixture is then concentrated at a low temperature, preferably under vacuum, until its water content is within the range from about 8 to about 15%, so as to precipitate as much formate salt as is possible. Some of the unreacted formaldehyde also is removed. The solid materials which separate are removed from the crude liquor by filtration or centrifuging or other suitable method.

Any inorganic or organic acid can be used in the neutralization. Formic acid is a desirable additive, because it does not introduce an extraneous impurity. However, hydrochloric, sulfuric, and acetic acids are exemplary of other acids that can be used.

While it is possible to concentrate the reaction mixture to less than 8% water, this usually is not desirable because the viscosity of the mix increases to a point at which it is difficult to separate the solid materials which precipitate. On the other hand, the water content should be below 15%, if practical, because the more water, the more formate remains in solution.

The remaining ionizable material is removed from the liquor by ion exchange. A cation exchange resin is employed to remove the cations, and an anion exchange resin is employed to remove formic acid anion and color bodies which may be present. The acidity of the cation exchange resin is not critical, since even weakly acidic resins will remove inorganic alkali and alkaline earth metal cations. Typical cation resins are those which contain a large plurality of sulfonic acid groups in the resin molecule, substituted on an aromatic isocyclic or heterocyclic ring, or on an aliphatic chain which may itself be substituted on an aromatic ring. These resins are prepared by interreaction of an aldehyde, a phenol and sulfuric acid or a sulfite, or by sulfonating a resin having an aromatic ring in the molecule, such as tannin-aldehyde and phenol-aldehyde resins. Typical resins of this class are described in Patent No. 2,204,539 to Hans Wassenegger and Karl Jaeger, dated June 11, 1940, No. 2,366,007 to Gaetano F. D'Alelio, dated December 26, 1944, and No. 2,372,233 to Jack T. Thurston, dated March 27, 1945. Nuclear sulfonic acid type resins available commercially are Amberlite IR-120 (available from the Rohm and Haas Company), Dowex 50 (the resin set forth in Patent No. 2,366,007 and available commercially from the Dow Chemical Company), Permutit Q (a sulfonated styrene type) and Nalcite HCR (available from the Dow Chemical Company).

Strongly acidic carboxylic acid-type cation exchange resins, such as Permutit H, and the chloracetic acid-containing resins, also are satisfactory.

It is important that the anion exchange resin be strongly basic, since only strongly basic materials are capable of removing the undesirable color-forming by-products. A preferred class of strongly basic anion exchange resins is known to those skilled in the art as the quaternary ammonium anion exchange resins. These contain a large plurality of available quaternary ammonium groups on the resin molecule, substituted on an aromatic isocyclic or heterocyclic ring or on an aliphatic chain, which may itself be substituted on an aromatic ring, and are obtained by polymerization of an aromatic amine and an aldehyde, such as formaldehyde, or a polyamide, a phenol and an aldehyde, such as formaldehyde, and then quaternizing the amino group in the resin, as shown, for example in U.S. Patent No. 2,543,666 to Malden W. Michael, dated February 27, 1951. This class of resin may also be made by polymerizing a quaternary ammonium salt, a phenol and an aldehyde, or by polymerizing an aromatic benzene containing an ethylenic substituent and one or more quaternary ammonium groups. Commercially available quaternary ammonium anion exchange resins are sold under the trade names Amberlite IRA-400 and Amberlite IRA-410 (available from the Rohm and Haas Company), Dowex 1, Dowex 2, Nalcite SBR, and Nalcite SAR (all available from the Dow Chemical Company), and Permutit S-2.

The ion exchange treatment is most effective if the solution is diluted with water after separation of solid materials to an organic solids content within the range from about 30 to about 50%. This solution can be flowed through the beds of resin more quickly, and the ion removal is more complete. The effluent may have a higher water content than is desired, and if so, water is readily removed by evaporation or distillation.

The effluent from the ion exchange resin beds is of excellent color, substantially free from inorganic and organic salt ions. The only remaining impurities are from about 3 to about 10%, usually 5 to 6%, unionizable organic materials of unknown chemical constitution, not removed in the previous processing, such as trimethylolalkane formates, ethers, formals, and like by-products as identified heretofore which may possibly be formed in the reaction. The solution is of sufficient purity to meet commercial grade requirements, and can be sold as such, or part or all of the water removed, as desired.

The yield of trimethylolalkane by the process of the invention is good, usually upwards of 90%, and frequently within the range from 94 to 98%.

The following examples represent in the opinion of the inventors the best embodiments of their invention.

*Example 1*

894 pounds of 33.31% formaldehyde and 2494 pounds of water were mixed in a reactor. To this mixture 174 pounds of propionaldehyde and 625 pounds of a slurry containing 143 pounds of lime and 482 pounds of water were added slowly. The temperature was kept at 30° C. throughout the addition, with the aid of cooling water when required. Two hours were required for addition of propionaldehyde, and one and one-half hours for addition of the lime slurry. After all of the lime slurry had been added, the reaction was continued at 30° C., for an overall time of seven hours. At the conclusion of this time the reaction mixture contained a small amount of precipitated material, which when allowed to settle left a water-white supernatant liquor.

The reaction mixture was acidified to a pH of 8 by addition of formic acid and filtered. The filtrate was brought to a pH of 7 by more formic acid, and concentrated at room temperature under vacuum to a water content of 8%. Calcium formate precipitated during the concentration, and was removed by filtration. The filtrate then was diluted with an equal volume of water and passed through a bed of strongly acidic cation exchange resin of the sulfonated styrene type (Permutit Q) and then through a bed of strongly basic anion exchange resin of the polystyrene quaternary ammonium type (Permutit S-2). The deionized effluent, substantially free from calcium and formate ion, was evaporated to dryness and grained. The yield was 96%.

The trimethylolethane was graded for color by subjecting it to a color stability test in which equal parts of trimethylolethane and phthalic anhydride were mixed and heated to 200° C. for seven minutes. The melt was then compared to APHA color standards. The result was an APHA color of 75.

These results are to be contrasted with a similar reaction product, prepared by a reaction carried out for twenty-four hours. In this preparation 940 pounds of 33.59% formaldehyde and 2465 pounds of water were mixed in a reactor. To this mixture 174 pounds of propionaldehyde and 625 pounds of a lime slurry containing 143 pounds of lime and 482 pounds of water were added slowly, as before, keeping the temperature at 30° C., cooling with water when required. The reaction was then carried out for an overall time of twenty-four hours at 30° C., and the reaction mixture neutralized, filtered, concentrated, and treated with ion exchange resins as set forth above.

The yield was 81.7%. The resulting trimethylolethane had an APHA color of 500+ by the test described. The better color of the product of the invention is evident.

*Example 2*

77.5 pounds of 34.68% formaldehyde and 281.2 pounds of water were mixed in a reactor. To the mixture was added slowly and evenly over a two hour period 26.8 pounds of 93.5% n-valeraldehyde and over a one and one-half hour period a slurry of 13.8 pounds of lime and 36 pounds of water. The temperature was kept at 30° C. throughout the addition with the aid of cooling water when required. After addition of the lime slurry was complete, the reaction was continued for an overall time of seven hours at 35° C. The reaction mixture was acidified by formic acid to a pH of 7, and filtered. The liquor was then concentrated under vacuum at 70° C. to a water content of 12%. Calcium formate precipitated, and was removed by filtration.

The filtrate was diluted with an equal volume of water and the diluted solution passed through a mixed bed of cation exchange resin of the strongly acidic cross-linked polystyrene type (Nalcite HGR) and the strongly anion exchange resin of the polystyrene quaternary ammonium type (Nalcite SBR). The deionized effluent, free from calcium and formate ion, was evaporated to dryness and grained. The yield was 92.96%. The resulting trimethylolbutane was subjected to the color test described in Example 1, and had an APHA color of 100.

*Example 3*

Example 2 was repeated, substituting 24 pounds of n-butyraldehyde for the valeraldehyde, with comparable results.

*Example 4*

838 pounds of 35.43% formaldehyde and 2750 pounds of water were mixed in a reactor. To this mixture slowly and evenly over a two hour period was added 174 pounds of propionaldehyde and over a one and one-half hour period 288 pounds of a 50% sodium hydroxide solution. The temperature was kept at 30° C. through the addition, with cooling water when required. After addition of the sodium hydroxide solution was complete, the reaction was continued for an overall time of seven hours at 30° C. The reaction mixture was acidified to a pH of 8 with dilute sulfuric acid, filtered, and then the pH of the reaction mixture was brought to 7 by addition of more dilute sulfuric acid.

The filtrate was concentrated under vacuum at room temperature, and the sodium formate which precipitated was removed by filtration. The filtrate was then passed through a mixed bed of sulfonated styrene type cation exchange resin (Permutit Q) and polystyrene quaternary ammonium type strongly basic anion exchange resin (Permutit S-2). The deionized effluent was substantially free from sodium, sulfate and formate ions.

The effluent was then evaporated to dryness and grained. The yield was 97.7%. When tested by the color test of Example 1, the trimethylolethane had an APHA color of 100.

*Example 5*

815 pounds of 34.23% formaldehyde and 2251 pounds of water were mixed in a reactor. To this mixture, slowly and evenly over a two hour period, was added 174 pounds of propionaldehyde and over a one and one-half hour period 625 pounds of a lime slurry containing 143 pounds of lime and 482 pounds of water. The temperature was kept at 30° C. throughout the addition, with the aid of cooling water when required. After addition of the lime slurry was complete, reaction was continued for an overall time of seven hours at 30° C. The reaction mixture then was brought to a pH of 7 by addition of dilute formic acid and filtered.

The neutralized filtrate was concentrated in vacuum at 30° C. to a water content of 9%. Calcium formate precipitated and was separated by centrifuging. The centrifugate was diluted with an equal volume of water, and passed through a mixed bed of the cation exchange resin Nalcite HGR and the anion exchange resin Nalcite SBR. The effluent was substantially free from calcium and formate ion.

The effluent was dried in vacuo and the produce grained. The yield was 94.2%. The trimethylolethane thus obtained was tested by the color test of Example 1, and had an APHA color of 75.

This reaction is very similar to that of Example 1. The only difference is in the ion exchange resins used. The color of the product was equivalent to that of Example 1, showing that the particular ion exchange resins had no effect on color, provided they are of equal efficiency in removing salt ions.

The trimethylolalkane which is obtained by this process has superior properties. Many formulations of alkyd resins will be found to body more rapidly, using the trimethylolalkane of the invention, than with either pure trimethylolalkane or the commercial grades of trimethylolalkane heretofore available. Moreover, the color of the alkyd resin is not darkened, showing that the color-forming bodies present in the impure prior trimethylolalkanes of commercial grade have been eliminated. Resin films containing driers cure quickly to a tack-free, and then to a hard, surface.

The following example shows the considerably more rapid bodying time in the preparation of alkyd resins that is obtained using the trimethylolethane of the invention, as compared to pure trimethylolethane.

*Example 6*

A soya oil-modified phthalic alkyd was prepared, using pure trimethylolethane having a hydroxyl value of 42.78. The soya oil (202.5 g.) was heated with stirring in a round-bottom flask to 300° F. The trimethylolethane (93.2 g.) was added and the temperature raised to 400° F. Litharge PbO (0.11 g.) was added and the temperature then raised to 450° F., and the mixture held at this temperature until alcoholysis was complete. This required thirty minutes. The phthalic anhydride (154.4 g.) was added, and the temperature brought to 470° F. to carry out the resinification. The acid value of the reaction mixture was followed and reaction continued until the acid value had reached 6.4, and when diluted to 70% solids with xylene had a viscosity of Y-Z on the Gardner scale and a color of 8-9 on the Gardner-Holdt scale. This required six hours heating at 470° F. After the addition of driers as naphthenates to give metal contents of 0.1% of lead, 0.02% cobalt and 0.02% manganese, films of 0.003 mm. in thickness were drawn on glass panels and baked at 60° C. until a thorough dry was obtained. The film was tack-free after four hours and after three days had a Sward hardness of 24.

This procedure was repeated, substituting trimethylolethane prepared in accordance with the process of Example 1. 97 g. was used, since this had a hydroxyl value of 41.10, and the amount added thus had the equivalent of the 42.78 hydroxyl value of the pure trimethylolethane used in the preceding run. The alcoholysis was carried out exactly as before, and resinification after addition of the phthalic anhydride was effected by heating at 470° F. until the acid value had reached 8.5, and when diluted to 70% solids with xylene had a viscosity of Z on the Gardner scale and a color of 8-9 on the Gardner-Holdt scale. This required only 4¼ hours cooking time. Thus, by using the trimethylolethane of the invention the cooking time was reduced by one-third. After the addition of driers as naphthenates to give metal contents of 0.1% of lead, 0.02% cobalt, and 0.02% manganese, films of 0.003 mm. in thickness were drawn on glass panels and baked at 60° C. until a thorough dry was obtained. The film was tack-free after four hours and after three days had a Sward hardness of 24. Since the only difference between the trimethylolethanes used in these runs was in the content of organic material of unknown composition in the trimethylolethane of the invention, it is assumed that this material in some way catalyzed the reaction. However, this conclusion is merely advanced as an explanation, and is in the nature of a hypothesis which has not been proved by experimental evidence.

Furthermore, the color of the alkyd resin was not darkened by the trimethylolethane of the invention.

The trimethylolalkanes of the invention can be used advantageously in the uses to which trimethylolalkanes have been put in the past. They are, as seen above, especially advantageous in the preparation of alkyd resins, both of the drying and nondrying or baking types. Such resins, as is well known, are prepared by reaction of the trimethylolalkane with organic polycarboxylic acids. Dicarboxylic acids are usually used, but tricarboxylic acids and higher polycarboxylic acids can be substituted in whole or in part for dicarboxylic acids.

The organic acids should have from two to twelve carbon atoms. Both aliphatic and aromatic acids may be used, and the acids can be used in the form of the anhydrides where they exist. The anhydrides have the advantage that water is not liberated as a by-product in the course of the esterification. Typical acids are maleic acid and its anhydrides, phthalic acid and its anhydrides, adipic acid, sebacic acid, azelaic acid, glutaric acid, succinic acid, dodecandioic acid and terephthalic acid. Oil-modified alkyd resins are prepared by incorporating a fatty oil in the reaction mixture. Drying oils such as linseed oil and soyabean oil can be used when an air-drying type of alkyd is desired, and nondrying oils such as cottonseed oil can be used when a baking type of alkyd is desired. Semi-drying oils such as tung oils also can be used.

The trimethylolalkanes also are useful in the preparation of polyester resins, which are polymers of saturated or unsaturated, usually allyl, carboxylic esters. The polyesters are thus made up of ester units as are the alkyd-type resins. They are prepared by reaction of the trimethylolalkane with an organic polycarboxylic acid, or polymer thereof, which ester may then be reacted with, for example, diisocyanates, to form polyurethane resins. Mixtures of adipic or maleic acid or anhydride and phthalic anhydride are used to prepare well known types of polyester resins.

The lower melting point of the trimethylolalkane of the invention is advantageous in the preparation of polyester resins, since the alcohol is usually put in the kettle and melted before the other ingredients are added, and this enables a reduction in the heating-up time, as well as reduce discoloration from overheating. The resinification may also proceed more rapidly using the trimethylolalkane of the invention.

We claim:
1. A process for the preparation of trimethylolalkanes having a color on the APHA color scale of between about 50 and about 200 when in the form of a molten mixture with an equal part of phthalic anhydride after seven minutes at 200 degrees C. which comprises mixing in aqueous medium a straight-chain alkanal having from three to five carbon atoms and formaldehyde in the presence of an alkaline catalyst selected from the group consisting of alkali metal hydroxides and alkaline earth metal hydroxides at a temperature below 40 degrees C. at which reaction proceeds for a time not exceeding seven hours until substantially three mols of formaldehyde are consumed per mol of said alkanal employed, said reactants being in a concentration of from 5 to 20%, by weight, of the reaction mixture; reducing the pH to below about 7; concentrating the reaction mixture to a water content within the range from about 8 to about 15%; separating formate salt which precipitates from the concentrate; contacting the remaining solution with cation exchange resin and strongly basic quaternary ammonium anion exchange resin to remove formate ion and inorganic ions derived from the alkaline catalyst; and recovering an effluent comprising trimethylolalkane substantially free from such ions.

2. A process in accordance with claim 1 in which the alkaline catalyst is calcium hydroxide.

3. A process in accordance with claim 1 in which the pH of the reaction mixture is reduced with formic acid.

4. The process of claim 1 wherein, at the end of the stated reaction period, the pH is reduced to below about 8, solid material is removed from said mixture, and the pH is reduced to below about 7 before the stated concentrating step.

5. The process for the preparation of trimethylolethane having a color on the APHA color scale of between about 50 and about 200 when in the form of a molten mixture with an equal part of phthalic anhydride after seven minutes at 200 degrees C. which comprises reacting in aqueous solution propionaldehyde and formaldehyde in the presence of an alkaline catalyst selected from the group consisting of alkali metal hydroxides and alkaline earth metal hydroxides at a temperature below 40 degrees C. at which reaction proceeds for a time not exceeding seven hours until substantially three mols of formaldehyde are consumed per mol of propionaldehyde employed, said reactants being in a concentration of from about 5 to about 20%, by weight, of the reaction mixture; adding an acid selected from the group consisting of hydrochloric acid, sulfuric acid, formic acid and acetic acid until the pH is reduced to below about 7; concentrating the reaction mixture to a water content within the range from about 8 to about 15%; separating formate salt which precipitates from the concentrate; contacting the filtrate with cation exchange resin and with strongly basic quaternary ammonium anion exchange resin to remove formate ions and inorganic ions derived from the alkaline catalyst, and recovering an effluent comprising trimethylolethane substantially free from such ions.

6. A process in accordance with claim 5 in which the alkaline catalyst is calcium hydroxide.

7. A process in accordance with claim 5 in which the pH of the reaction mixture is reduced with formic acid.

References Cited in the file of this patent

UNITED STATES PATENTS

| | | |
|---|---|---|
| 2,072,068 | Ellis | Feb. 23, 1937 |
| 2,211,938 | Rosenblum | Aug. 20, 1940 |
| 2,292,926 | Brubaker et al. | Aug. 11, 1942 |
| 2,420,496 | Poitras et al. | May 13, 1947 |
| 2,468,718 | Wyler | Apr. 26, 1949 |
| 2,790,837 | Robeson | Apr. 30, 1957 |

FOREIGN PATENTS

| | | |
|---|---|---|
| 1,041,027 | Germany | Oct. 16, 1958 |